US011338837B2

(12) United States Patent
Falomir Estarelles

(10) Patent No.: US 11,338,837 B2
(45) Date of Patent: May 24, 2022

(54) TRANSPORTATION DEVICE AND STABILIZER FOR SAME

(71) Applicant: Mireia Falomir Estarelles, Valencia (ES)

(72) Inventor: Mireia Falomir Estarelles, Valencia (ES)

( * ) Notice: Subject to any disclaimer, the term of this patent is extended or adjusted under 35 U.S.C. 154(b) by 486 days.

(21) Appl. No.: 16/340,544

(22) PCT Filed: Oct. 11, 2017

(86) PCT No.: PCT/ES2017/070661
§ 371 (c)(1),
(2) Date: Apr. 9, 2019

(87) PCT Pub. No.: WO2018/069559
PCT Pub. Date: Apr. 19, 2018

(65) Prior Publication Data

US 2019/0263438 A1 Aug. 29, 2019

(30) Foreign Application Priority Data

Oct. 11, 2016 (ES) .............................. ES201631318

(51) Int. Cl.
*B62B 9/12* (2006.01)
*A61G 1/04* (2006.01)
(Continued)

(52) U.S. Cl.
CPC .................. *B62B 9/12* (2013.01); *A61G 1/04* (2013.01); *B62B 5/0069* (2013.01); *B62B 5/02* (2013.01);
(Continued)

(58) Field of Classification Search
CPC .... B62B 9/12; B62B 9/00; B62B 9/02; B62B 9/18; B62B 9/22; B62B 5/0069;
(Continued)

(56) References Cited

U.S. PATENT DOCUMENTS 8,011,459 B2 * 9/2011 Serai .................... B62K 11/007 180/218
8,170,781 B2 * 5/2012 Fuwa .................. B62K 11/007 180/21
(Continued)

FOREIGN PATENT DOCUMENTS

DE 202016000898 U1 5/2016
EP 1967409 A1 9/2008
(Continued)

*Primary Examiner* — John D Walters
(74) *Attorney, Agent, or Firm* — The Webb Law Firm

(57) ABSTRACT

A transportation device and an automatic tilt stabilizer are disclosed herein. The transportation device has a structure with wheels joined by a shaft to a platform or chassis configured to support a basket, a mat, a seat and/or a tray. The automatic tilt stabilizer is configured to automatically stabilize the inclination of the platform or chassis, and includes a tilt sensor configured to detect an inclination of the platform or chassis, and a motor activated by a micro-controller configured to correct the inclination of the platform or chassis, so that the platform or chassis returns to a predefined inclination.

12 Claims, 2 Drawing Sheets

2
3
6
1
5
4

(51) Int. Cl.

| | |
|---|---|
| ***B62B 7/14*** | (2006.01) |
| ***B62B 9/00*** | (2006.01) |
| ***B62B 5/00*** | (2006.01) |
| ***B62B 5/02*** | (2006.01) |
| ***B62B 9/18*** | (2006.01) |
| ***B62B 9/22*** | (2006.01) |
| ***B62B 9/02*** | (2006.01) |
| *A61G 5/10* | (2006.01) |
| *A61G 5/06* | (2006.01) |
| *A61G 5/04* | (2013.01) |

(52) U.S. Cl.

CPC .................. *B62B 7/14* (2013.01); *B62B 9/00* (2013.01); *B62B 9/02* (2013.01); *B62B 9/18* (2013.01); *B62B 9/22* (2013.01); *A61G 5/04* (2013.01); *A61G 5/06* (2013.01); *A61G 5/107* (2013.01); *B62B 7/147* (2013.01); *B62B 2203/04* (2013.01); *B62B 2206/003* (2013.01); *B62B 2301/12* (2013.01)

(58) Field of Classification Search

CPC .. B62B 5/02; B62B 7/14; B62B 7/147; B62B 2203/04; B62B 2206/003; B62B 2301/12; A61G 1/04; A61G 5/04; A61G 5/06; A61G 5/107

See application file for complete search history.

(56) References Cited

U.S. PATENT DOCUMENTS

| | | | | |
|---|---|---|---|---|
| 8,346,441 | B2 * | 1/2013 | Miki | B62D 61/00 180/326 |
| 8,423,274 | B2 * | 4/2013 | Doi | B62K 11/007 180/218 |
| 9,352,765 | B2 * | 5/2016 | Vashdi | B62B 9/22 |
| 9,623,893 | B2 * | 4/2017 | Braidman | B62B 9/22 |
| 2009/0108553 | A1 | 4/2009 | Serai et al. | |
| 2009/0319124 | A1 | 12/2009 | Fuwa | |
| 2015/0197271 | A1 | 7/2015 | Vashdi et al. | |
| 2016/0107670 | A1 | 4/2016 | Braidman | |

FOREIGN PATENT DOCUMENTS

| | | | |
|---|---|---|---|
| EP | 2128012 | A1 | 12/2009 |
| ES | 1146361 | U | 11/2015 |
| FR | 2791939 | A1 | 10/2000 |

* cited by examiner

TRANSPORTATION DEVICE AND STABILIZER FOR SAME

CROSS-REFERENCE TO RELATED APPLICATIONS

This application is the United States national phase of International Application No. PCT/ES2017/070661 filed Oct. 11, 2017, and claims priority to Spanish Patent Application No. P201631318 filed Oct. 11, 2016, the disclosures of which are hereby incorporated by reference in their entirety.

BACKGROUND OF THE INVENTION

Field of the Invention

The present disclosure relates to a transport device, such as a baby carriage, a wheelchair, a stretcher, or any device for transporting the sick or disabled, or small children, or any type of product that requires balanced transport. This device has active or passive stabilizing elements, although preferably the stabilizing elements are active.

The disclosure also relates to an example of an active stabilizer that is applicable to the device.

Babies and small children are often transported in carriages or strollers. These means of transport have a series of wheels (3 or 4), a platform that is horizontal in carriages and a seat that is more or less tilted in baby strollers.

Upon encountering uneven surfaces in the form of steeply inclined ramps or stairs, the father or mother must manually correct the position of the baby or child so that the same is not uncomfortable or at risk of falling. This generally implies exerting an upward or downward force on the handle of the carriage or stroller so that the same remains only over the front or rear wheels, respectively.

These types of movements are complicated due to the heavy weight that must be lifted and to the risk of the baby or child falling or the carriage overturning. Moreover, in strollers with three wheels it may be impossible to carry out these movements in a certain direction, which implies that the carriage must be rotated to pull the child backwards.

Furthermore there is a series of adaptable baby carriages that can be used both as a carriage and as a stroller. These carriages have a horizontal rotational shaft to vary the tilt of the basket or chair, but it is not practical to adjust the same every time there is a change in the slope.

Wheelchairs have a similar problem, moreover due to the fact that they are not adjustable and, furthermore, the person being transported is considerably heavier than a child. In the case of ambulance stretchers, the risk is lower, since the person being transported is lying down, but in turn, there could be drips or other medical equipment that must not fall from the stretcher.

In transporting products such as food dishes in a hospital or restaurant, or moving products in a factory, it may be necessary to stabilize the platform or upper container in order to prevent liquids from coming out of the upper opening.

SUMMARY OF THE INVENTION

The disclosure consists of a transport device, for example, a baby carriage, a wheelchair or a stretcher, according to the claims that solve in the different embodiments thereof the problems of the state of the art.

The transport device of the disclosure is of the type that has a structure with wheels, joined by a shaft to a platform or chassis that supports the basket, mat or seat. It further comprises an automatic tilt stabilizer for the platform or chassis, which can be active or passive.

The platform or chassis can also support at least a tray (for example in the case of a carriage for trays of a hospital, restaurant, factory, etc.).

As an example of a passive stabilizer, it is preferable to have a counterweight on a level below the shaft, joined by one or more braces to the platform or chassis. If several braces are distributed on both sides of the shaft, in order to facilitate the movement in both directions, they will preferably be joined to the platform or chassis by joints and the braces of one side will be telescopic.

Likewise, it is possible to make the counterweight of an adjustable mass in order to adjust the total weight of the carriage.

The preferred active stabilizer, which also forms a concept of the disclosure, is formed from at least a tilt sensor and a motor activated by a microcontroller that corrects the inclination of the platform or chassis based on the signal from the tilt sensor. If the same is adjustable, it will be possible to adjust the inclination that will be stabilized.

The microcontroller is configured to act on the motor to correct the inclination of the platform or chassis so that said platform or chassis returns to a predefined inclination.

Preferably, the microcontroller is programmable by means of a first control (preferably situated on the handle of the transport device), such that it allows a specific inclination of the platform or chassis to be predefined (for example, with respect to the horizontal).

Preferably, the motor will correct the inclination of the platform or chassis by means of a crankshaft-rod mechanism.

Optionally, the microcontroller comprises a filter for the tilt sensor signal.

According to a possible embodiment, the microcontroller is configured to act on the motor only if a predetermined inclination is exceeded during the predetermined time interval.

According to an additional aspect of the disclosure, the microcontroller is configured to send, by means of a second control (preferably situated on the handle of the transport device) instructions to the motor, independently from the signals received from the tilt sensor, to introduce a rocking motion of the platform or chassis of the transport device.

According to a possible embodiment of the transport device, the same has the option of deactivating the stabilizer and fastening or locking the platform or chassis with a specific inclination angle (for example, with respect to the horizontal), such that once the stabilizer is deactivated, the platform or chassis will no longer level itself during occasional uneven surfaces of the terrain.

BRIEF DESCRIPTION OF THE DRAWINGS

For a better understanding of the disclosure, the following figures are included.

DESCRIPTION OF THE INVENTION

A brief description of an embodiment of the disclosure is provided below by way of illustration and not limitation of the same.

The disclosure relates to a transport device in general, but it will be described with an example made up of a baby carriage that is represented as a carriage. This carriage has a structure (1) with a series of wheels joined to a platform (2) on which the basket of the baby is mounted by a shaft (3). If applicable, the platform (2) will be shorter so that it corresponds to the base of a baby seat, or more preferably it will be substituted by a frame (not shown) with the shape of the seat.

Arranged on the joint between the structure (1) and the platform (2) or chassis will be an automatic stabilizer (4) for tilting the platform (2) or chassis over the shaft (3). The stabilizer (4) can be active or passive, each one having its own advantages.

Figure 1:
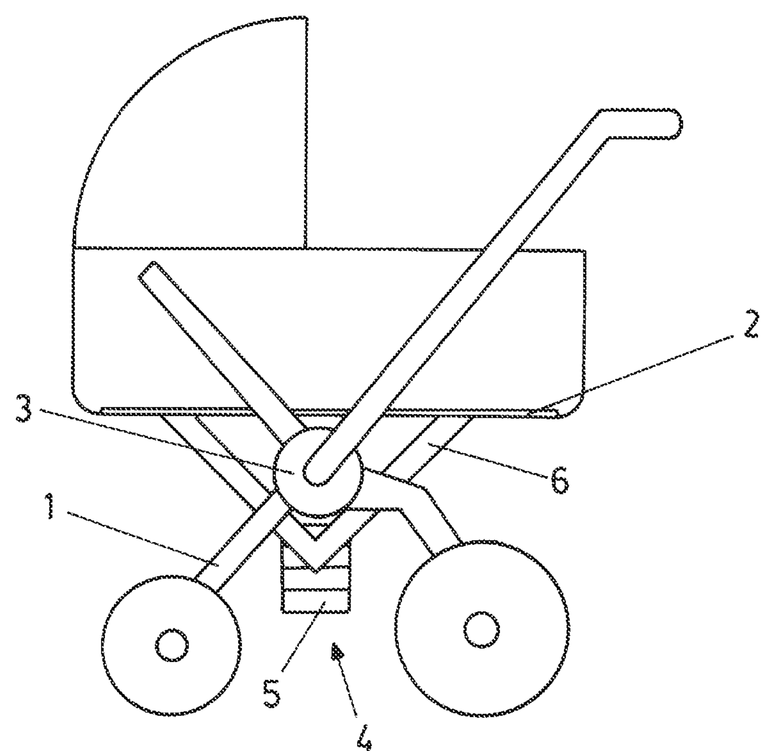
FIG. 1: Schematic side view of an example of the application of the disclosure to a baby seat with a passive stabilizer.
Figure 2:
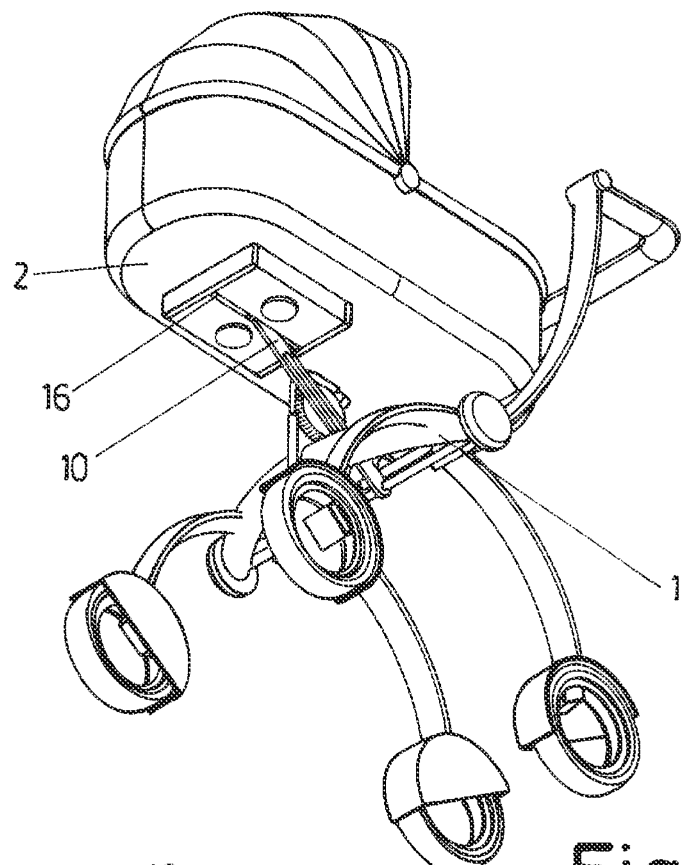
FIG. 2: General view, from a lower position, of an example of the active stabilizer coupled to a carriage.

An example of a passive stabilizer (4) comprises a counterweight (5) situated below the shaft (3), and with a weight greater than the combined weight of the child or children and the basket. Since the weight of small children varies, the counterweight (5) will preferably be adjustable, adding or removing elements. The counterweight (5) will be joined to the platform (2) or chassis by the corresponding braces (6). In FIG. 1 two V-shaped braces can be seen, but it could be any number.

According to the effective length or orientation of each brace (6), the position that will be stabilized will be horizontal (carriage) or tilted (seat). To do so, it is recommended that braces (6) be arranged from the two ends of the platform (2) or chassis, and that at least the brace (6) or braces (6) on one side be telescopic. In this case, the connection of the braces (6) to the platform (2) or chassis will be by means of joints. Thus, by lengthening or shortening the braces (6) on one side of the platform (2) or chassis, the equilibrium position varies.

If the geometry of the carriage makes the platform (2) or chassis remain below the shaft (3), the braces (6) can be eliminated.

This solution has the advantage in that it does not require power and is highly reliable. However, the weight of the carriage significantly increases, and therefore it is not the preferred solution.

The most preferred solution, which forms part of the disclosure as an independent element, comprises an active stabilizer (4), which is based on a tilt sensor (7), for sensing the inclination of the platform (2) or chassis, both laterally and longitudinally to the carriage, by means of accelerometers or automatic levels (gravity or magnetic compensator). This tilt sensor (7) can be adjustable to define the inclination one wishes to stabilize, or can be programmed by means of a control on the handlebar of the carriage.

The signal of the corresponding tilt sensor (7) is transferred to a microcontroller which acts on a motor (9), preferably a stepper motor, which carries out the movement of the platform (2) or chassis so that it returns to the predefined position, normally horizontal. This movement is generally carried out through an arm (10).

Preferably, the microcontroller is the element that can be programmed by means of a control situated for example on the handlebar of the carriage, such that the inclination one wishes to stabilize can be predefined.

Preferably, the signal of the tilt sensor (7) or sensors passes through a filter to eliminate interference and avoid the values that one does not want to take into account. For example, it is able to act only when an angle of X degrees is exceeded (predefined or programmable) during a time of N seconds. Then, by means of a control law, the movement that the motor (9) must make is indicated (steps, angle, revolutions, etc.) as well as the direction for correcting the position of the platform (2) or chassis.

Figure 3:
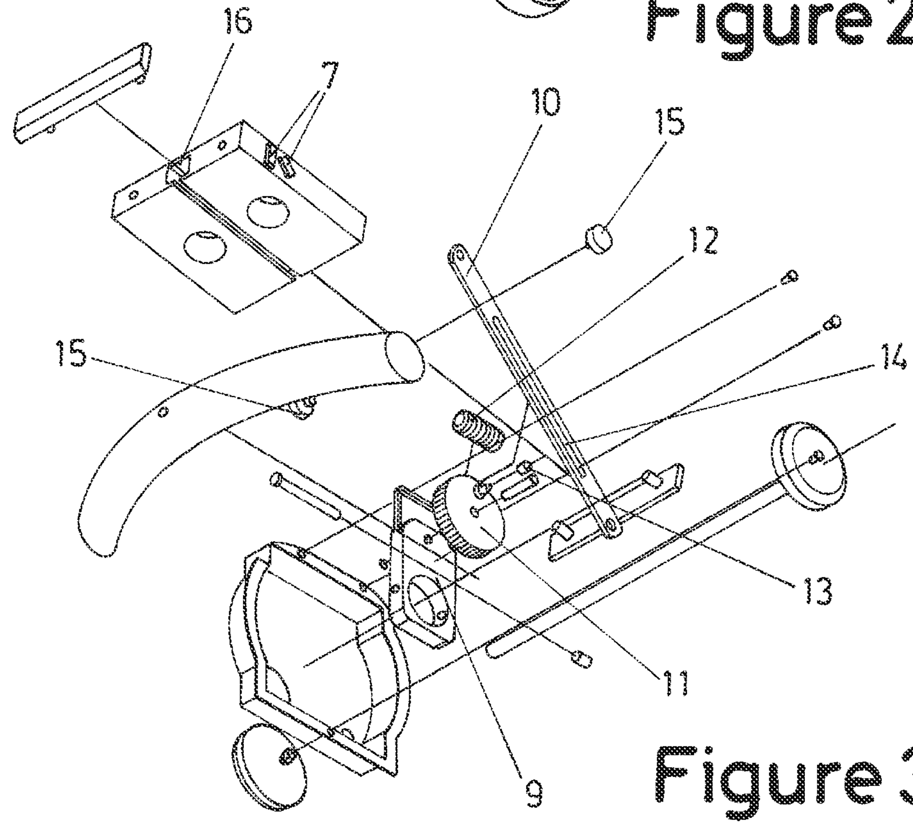
FIG. 3: Exploded view of the stabilizer of the example of FIG. 2.

The motor (9) can act on the arm (10) in several ways (crankshaft-rod, rack and pinion, linear motor, etc.). The preferred form is the mechanism of the crankshaft-rod shown in FIG. 3, formed by a rotor (11), which in this case is actuated by a worm drive (12) with an eccentric projection (13) (rod) which slides with rotation on the longitudinal axis in an elongated hole (14) in the arm (10) which acts as a connecting rod. In turn, the arm (10) has a fixed end resting against the structure (1) and the other end fixed to the platform (2) or base by means of a pair of wheels (15) that are able to slide on a guide (16) joined to the platform (2) or base. These mobile elements will be in a casing, of which one half has been removed in the exploded view of FIG. 3.

These mechanisms will require a power source, which can be on the lower part of the structure (1) to help with the stability of the carriage.

When the stabilizer (4) is active, it is possible to include a rocking function of the baby, such that the motor (9) is alternatively activated in opposite directions, independent from the signals of the tilt sensor (7).

The invention claimed is:

1. A transportation device comprising a structure including wheels joined by a shaft to a platform or chassis configured to support a basket, a mat, a seat and/or a tray, and an automatic tilt stabilizer for the platform or chassis, wherein the automatic tilt stabilizer comprises: a tilt sensor configured to sense an inclination of the platform or chassis with respect to a horizontal axis, and a motor activated by a microcontroller to correct the inclination of the platform or chassis, such that the platform or chassis returns to a predefined inclination with respect to the horizontal axis, thereby automatically leveling the platform or chassis upon encountering an uneven surface of a terrain;

wherein the microcontroller is programmed by a first control to predefine a specific inclination of the platform or chassis; and wherein the microcontroller comprises a second control configured to send instructions to the motor, independent from signals sent by the tilt sensor, to rock the platform or chassis of the transport device.

2. The transportation device according to claim 1, wherein the tilt sensor is adjustable.

3. The transportation device according to claim 1, wherein the first control is arranged on a handle of the transportation device.

4. The transportation device according to claim 1, wherein the microcontroller comprises a signal filter for the tilt sensor.

5. The transportation device according to claim 4, wherein the microcontroller is configured to activate the motor only if a predefined inclination is exceeded during a predetermined time interval.

6. The transportation device according to claim 1, wherein the second control is arranged on a handle of the transport device.

7. The transportation device according to claim 1, wherein the motor is connected to the platform or chassis by a crankshaft-rod mechanism.

8. The transportation device according to claim 1, wherein the motor is connected to a rotor by an eccentric projection configured to slide in an elongated hole of an arm, the arm comprising a first end fixed to the structure and a second end configured to slide on a guide fixed to the platform or chassis.

9. A stabilizer for a transportation device, the stabilizer comprising: at least one tilt sensor configured to sense the inclination of a platform or chassis with respect to a horizontal axis, the tilt sensor connected to a microcontroller comprising a signal filter for the tilt sensor, the microcontroller configured to activate a motor to correct an inclination of the platform or chasis and return the platform or chassis to a predefined inclination with respect to the horizontal axis, thereby automatically leveling the platform or chassis upon encountering an uneven surface of a terrain;

wherein the microcontroller is programmed by a first control to allow a specific inclination of the platform or chassis to be predefined; and wherein the microcontroller comprises a second control configured to send instructions to the motor, independent from signals sent by the tilt sensor, to rock the platform or chassis of the transport device.

10. The stabilizer according to claim 9, wherein the motor is connected to the platform or chassis by an arm.

11. The stabilizer according to claim 10, wherein the motor is connected to a rotor comprising an eccentric projection configured to slide in an elongated hole of the arm, the arm comprising a first end configured to be fastened to the structure and a second end including wheels configured to slide on a guide configured to be fixed to the platform or chassis.

12. The stabilizer according to claim 9, wherein the microcontroller is configured to activate the motor only if a predefined inclination is exceeded during a predetermined time interval.

* * * * *